Jan. 12, 1932.  P. TARAGNO  1,840,542
FUEL INJECTING DEVICE FOR INTERNAL COMBUSTION ENGINES
Filed Sept. 9, 1929   3 Sheets-Sheet 2
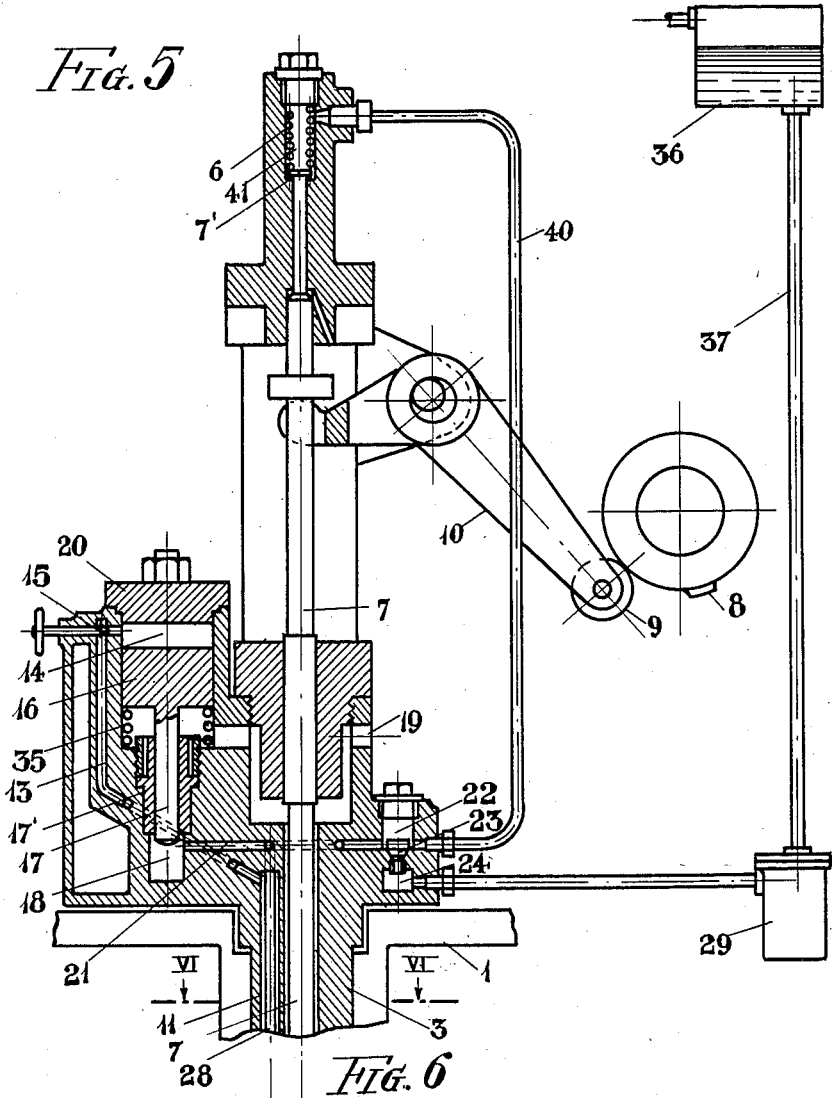
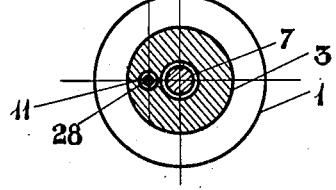
Inventor:
P. Taragno.
By Marks & Clerk
Attorneys.

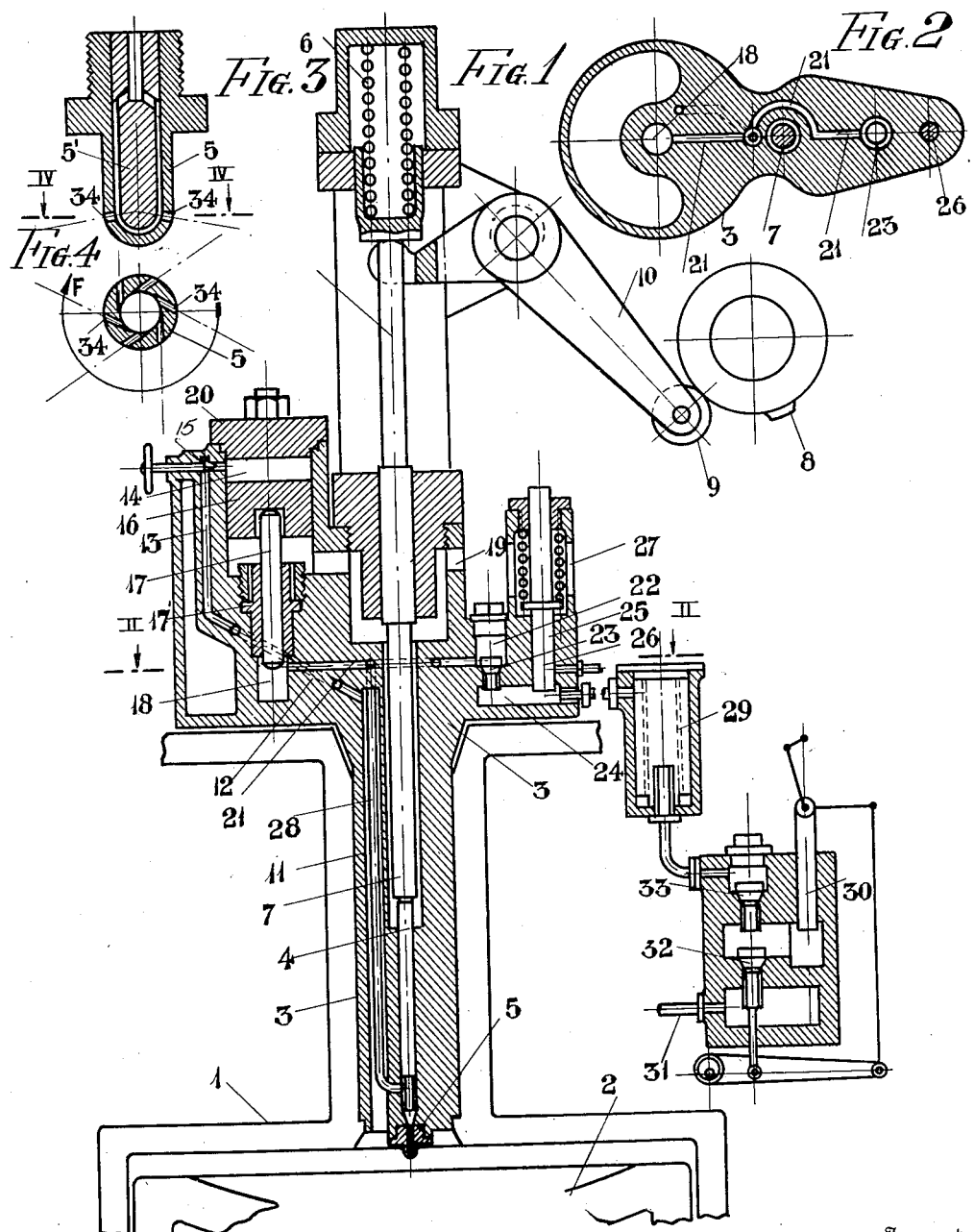

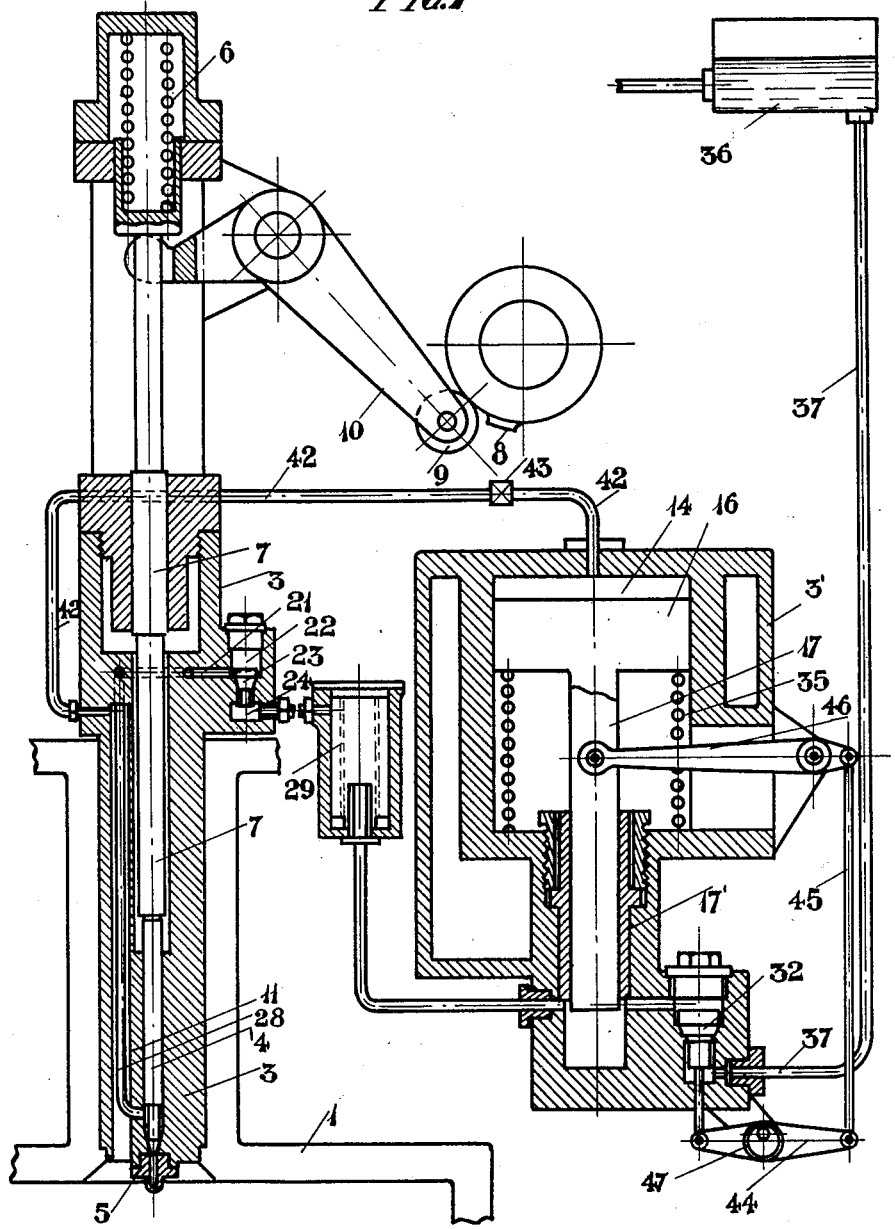

Patented Jan. 12, 1932

1,840,542

UNITED STATES PATENT OFFICE

PIETRO TARAGNO, OF TURIN, ITALY

FUEL INJECTING DEVICE FOR INTERNAL COMBUSTION ENGINES

Application filed September 9, 1929. Serial No. 391,376.

It is well known that there are some fuel injecting devices for internal combustion engines in which the liquid fuel is injected by means of a stepped piston moved by the compression pressure of the engine, the small diameter portion of this piston being used as the injection piston. A disadvantage of the known devices of this kind is that the instant of injection depends upon the injection pressure, so that the injection does not always take place at the most favorable point of the cycle. In these known devices also, an effect of the gradual increase of difference of pressure between the two faces of the stepped piston is to cause the injection velocity to be very low, which hinders the fuel and air from mixing intimately in the combustion chamber owing to lack of pulverization.

The object of the present invention is to eliminate the said disadvantages and to produce an injection device as above referred to, whereby the point of injection in the cycle is kept constant independently of the injection pressure and whereby a good mixture of liquid fuel and air during the injection is provided.

According to the present invention the fuel injecting nozzle is controlled by a mechanically operated needle valve with the advantage that the injection begins at a stated moment during the working cycle at which the injection pressure created by the stepped piston is the greatest, so that the injection velocity is kept high, and pulverization is promoted. Pulverization is also further assisted, in that the injection conduit, which opens into a chamber just above the nozzle, is disposed very near and parallel to the needle valve stem within a conduit which opens adjacent to the fuel nozzle, this conduit connecting the cylinder compression space with the space existing over the stepped piston; so that the liquid fuel which is at a high pressure is preheated before and during the injection. For preheating the fuel, and at the same time cooling the nozzle, a narrow annular conduit formed by a piece inserted in the nozzle body, and having an outside diameter relatively great, is provided; from this annular conduit lead small injection or spraying openings tangentially disposed to the periphery of the annular conduit.

The stepped piston is so disposed that it may be easily changed and the portion which acts as the injection piston is placed in an interchangeable sleeve the bore of which is selected according to the diameter of the injection piston used. Thus it is possible to set the injection pressure and the injection velocity exactly to the desired amounts.

The injecting device is fed by a separate fuel feeding pump by way of a check valve; and this separate pump works independently and feeds continually. For receiving the excess fuel a compensation reservoir is provided before the check valve in the delivery conduit of the feed pump.

The block comprising the stepped piston operated by the compression pressure of the engine and the attached injection-pump may be separate from the injection-valve body. For transmitting the compression pressure to the upper face of the stepped piston, a special conduit is provided. The rate of the supply of the fuel is controlled by a controlling-device applied to the injection valve of the injection-pump.

With these objects in view and others which will clearly appear in the following description and claims a preferred form of the invention is hereinafter described with reference to the accompanying drawings.

In the drawings:

Fig. 1 is a sectional view made along the axis of an injection device according to the present invention;

Fig. 2 is a cross-sectional view taken on line II—II of Fig. 1;

Fig. 3 is an enlarged axial section of the spraying nozzle;

Fig. 4 is an enlarged cross-sectional view taken on the line IV—IV of Fig. 3;

Fig. 5 is an axial schematical section of an injection device; different from the one of Fig. 1, though it is based on the same principle;

Fig. 6 is a cross-sectional view taken on the line VI—VI of Fig. 5;

Fig. 7 is an axial schematical section showing a variation of the device represented in Fig. 1.

Like numerals designate corresponding parts in all of the figures of the drawings.

Referring now to the Figs. 1, 2, 3 and 4, 1 is a working cylinder head of a Diesel motor or the like; 2 is the upper portion of the piston sliding in the said cylinder 1. In a body 3 fixed in a suitable seating axially bored in the cylinder head 1 is slidably mounted the needle 4 which, by means of its conical end closes the lower orifice which communicates with the spraying nozzle 5. The needle 4 is kept in the closed position by a spring 6 which acts by means of an intermediate rod 7. The opening of the said lower orifice is performed by raising the needle 4 which raising is mechanically obtained according to the methods used in the usual fuel sprayers with injection by compressed air for Diesel engines; that is, for example, by means of a cam 8 acting on the roller 9 on the end of a lever 10 which acts at its other end on the intermediate rod 7.

In the same body 3 parallel to the axial bore in which slides the needle 4 and laterally to it is formed a cylindrical conduit 11 the lower end of which opens freely in the cylinder at a place very near to the sprayer 5 and above the latter. The conduit 11 is connected at its upper end with an inclined conduit 12 bored in the body 3; this conduit 12 is continuous with another vertical conduit 13 and by the passage formed by the conduits 11, 12 and 13, the interior of the cylinder communicates with a cylindrical chamber 14 bored in the body 3 with a vertical axis laterally displaced relative to the axis of the conduit 11. A suitable valve 15 regulates the communicating port between the conduit 13 and the chamber 14. In this cylindrical chamber 14 slides a piston 16 pressing on a cylindrical rod 17 of a smaller diameter slidably fitted in a sleeve 17' mounted in the body 3, which rod acts as a plunger in a cylindrical chamber 18 formed in the same body 3. The portion of the chamber 14 which is under the piston 16 is in constant communication with the atmosphere by means of some suitable holes 19 bored in the body 3. The upper end of the cylindrical chamber 14 is tightly closed by a suitable head 20. The said cylinder 18 communicates laterally with a horizontal conduit 21, formed in the body 3 in such a manner that it does not interfere with the axial hole accommodating the rod 7 (see Fig. 2), and leading into a chamber 22 where, on a suitable seating, lies a check valve 23 closing the mouth of a chamber 24 which communicates at the other end with a cylindrical chamber 25 in which is slidably fitted a plunger 26 pressed down by a suitable spring 27.

Into the horizontal conduit 21 at the place where its axis meets the axis of the vertical conduit 11, a pipe 28 is inserted; this pipe has the same axis as the conduit 11 and an outside diameter small enough to allow a sufficient clearance in the conduit 11; it descends in the interior of the said conduit 11 and is inserted at its lower end, with suitable lateral curve, into the wall of the axial bore in which slides the needle 4 at a point above the orifice of communication with the sprayer 5. The pipe 28 may be placed in position during the casting of the body 3. In this manner the conduit 21 communicates with the said orifice and with the spraying nozzle when the needle 4 opens the said orifice. The cylindrical chamber 25 which in the preferred form is formed in the body 3 or fixed to it, communicates, by means of a suitable outward conduit, with a filter 29, and this filter with a fuel pump 30, operated by the engine in any suitable manner. The spraying nozzle 5 is of the type shown in the Figs. 3 and 4. The small diameter spraying holes 34 instead of being radial as usual, are formed tangentially to the inner cylindrical hole in such a manner that the jets issuing from said holes give a whirling motion to the gases contained in the combustion chamber, in the direction of the arrow F; improving the mixing of the liquid fuel and the air, and thus obtaining a more complete combustion.

Simultaneously the vortex produced by the said rotation will maintain the combustion gases far from the sprayer during the burning, which helps some compressed hotair to pass into the conduit 11, almost without admixture of other hot gases. For this very important reason, the conduit 11 is bored in the body 3 as near as possible to the axial hole in which slides the needle, so that the distance from the aperture of this conduit 11 to the sprayer will be very small. Internally to the spraying nozzle is mounted a cylindrical member 5' (Fig. 3) having a diameter less than that of the inner hole in which the said member is introduced; this member (5') makes it possible to have the spraying nozzle 5 of a large diameter with a very little internal space; and this is very important for the reason that there must not remain in the sprayer a great quantity of non-injected fuel after the closing of the needle valve. Because of the large inside diameter and the narrow passage the surface of contact between the liquid fuel and the nozzle is very large, and thence the cooling of the nozzle by the fuel which passes therethrough is very efficacious; at the same time a further heating of the fuel is obtained; moreover, because of the large outside diameter of the nozzle, the whirling effect caused by the tangential holes is considerably improved.

The operation of the described device is as follows:

The hot-air compressed with traces of gas in the motor cylinder during the compression stroke, enters into the conduit 11 passes through the space surrounding the small diameter pipe 28, through the conduits 12 and 13 and into the chamber 14 over the piston 16. The pressure exerted by the said compressed air on this piston is transmitted by the plunger 17 (and increased according to the relation between the surfaces of the piston 16 and plunger 17) to the liquid fuel contained in the chamber 18 and fed thither by the pump 30 which, by sucking up the liquid fuel from the fuel supply pipe 31 with the usual system of suction-valves 32 and compression valves 33, pumps the same through the filter 29 into the cylindrical chamber 25 and through the check valve 23 to the conduit 21. The respective diameters of the piston 16 and plunger 17 are chosen so that the pressure attained by the fuel at the moment when the needle 4 rises and opens the orifice leading to the nozzle, will be the pressure required for injecting and pulverizing the fuel through the small holes 34 of the injection nozzle (Fig. 3). Thus a rapid injection of the whole "dose" of fuel will be secured at the exact instant required. The liquid fuel in the inner small pipe 28 is heated by contact with the hot air passing into the surrounding conduit 11, so that the fluidity and atomization of the fuel is improved, and the efficiency of combustion is very high. In case the hot air pressure in the chamber 14 is such that the resultant pressure produced by the plunger 17 on the fuel in the cylinder 18 is higher than the pressure maintained by the pump 30, the check valve 23 prevents the return of the fuel to the pump, which in the meantime forces the fuel into the chamber 25, raising up the plunger 26 against the action of the spring 27. It will thus be seen that the chamber 25 constitutes a pressure relief chamber to relieve the fuel pressure in the chamber 24. Then the liquid fuel is accumulated in the chamber 25 and forced again into the chamber 18, when in the course of the expansion stroke the pressure in the chamber 14 falls sufficiently to allow the pressure in the said chamber 18 to become less than the pressure of the pump. In such a manner the fuel supply is constantly and regularly maintained, whatsoever may be the type of the fuel pump and the relation between the movement of the said pump and the running of the motor. Another form of the described device, where the injection pump may be eliminated, is shown in Fig. 5. All the parts described as above are retained in the present variation and are indicated by similar reference numerals, except the cylindrical chamber 25, the plunger 26 and its spring 27, all of which have been suppressed with the pump 30. The fuel is drawn into the chamber 18 by the return movement of the piston 17, caused by the additional spring 35, which is compressed by the piston 16, under the pressure of the hot air in the chamber 14, and extends when the pressure of the air decreases during the exhaust or scavenging stroke of the piston 2. In such a manner the fuel is sucked by the plunger 17 directly from the supply tank 36 through the pipe 37, the filter 29, the chamber 24, the check valve 23 and the conduit 21. When the pressure of the hot air on the piston 16 becomes high the check valve 23 is closed and the fuel cannot return to the tank 36. In this device the needle 4 is maintained in the closed position by the rod 7 by means of the equalizing piston 7' having its diameter a little greater than that of the needle 4, and working in an upper chamber 41 directly communicating with the chamber 18 by means of the pipe 40; in this case the spring 6 may be weaker than is required by the device of Fig. 1, for this spring has not in this case to resist the pressure which tends to raise the needle 4. By a suitable eccentric device, not shown, the relative positions of the roller 9 and of the distribution-cam 8 may be changed, and thus the motion of the adjusting cam 7 may be modified according to the regime of the motor, this or any suitable system being provided for regulating the amount of fuel supplied, and for changing the moment of injection in the cycle.

Again another form is represented in Fig. 7 of the drawings. The object of this modification is to separate entirely the injector proper from the device for compressing the fuel for injection and at the same time to eliminate the separate supply pump. In this variation also the parts are indicated by like numerals used for the above described forms. The chamber 14 with its piston 16 and accessories has been taken away from the body 3 and placed in a body 3', separated from the injector proper, but is always in communication with the interior of the cylinder 1 by a pipe 42 which connects the upper portion of the conduit 11 with the chamber 14. A suitable valve 43 on the said pipe allows the chamber 14 to be sealed off to facilitate repairs or replacements. The plunger 17 sliding in the sleeve 17' and projecting into the chamber 18 within the body 3' sucks up the fuel in its stroke, under the action of a spring 35 as above described, and forces the liquid fuel into the injector through the filter 29, the chamber 24, the check valve 23, the conduits 21 and 28 as above stated. The fuel is drawn from a supply tank 36 through a pipe 37 and a valve 32, which is operated by the plunger 17 by means of coupled levers 44 and 46 connected by a link 45. The variation of the quantity of fuel fed by the supply pump is obtained, for instance, by varying the fixation angle of an eccentric 47 which forms the fulcrum of the lever 44. The operation of the last described form of the fuel injection device is the same as that disclosed for the other forms of the invention.

From the above description will appear very clearly the principal advantages given by the present invention, namely:—

1st—Supplying the fuel to the injection device by a low pressure feed pump, which may be operated independently of the engine.

2nd—Compression of the fuel within the injecting device.

3rd—Elimination of the fuel supply pump driven by the engine.

4th—Utilization of hot air, without wasting combustible mixture for operating the compression device.

5th—A better efficiency of combustion due to the pre-heating of the fuel within the injecting device and to the rotation of the fuel mixture, caused by the special form of spraying nozzle.

There may also be added, among the numerous minor advantages, that of regulating the quantity of the fuel according to the type of the same, and also the possibility of changing, according to the characteristics of the fuel, the pressure required for pulverization; this being simply obtained by exchanging the plunger 17 and the sleeve 17' for others of suitable diameters; this operation may be easily done during the operation of the engine by closing the valve 15 and removing the cover 20, provided of course that no harm will ensue from shutting down one cylinder at a time for short periods.

Other numerous variations may evidently be made and introduced in the described forms of this invention, without departing from the scope of the present appended claims.

Having thus described my invention what I claim is:

1. A fuel injector for internal combustion engines comprising a body for connection with the engine cylinder, a nozzle carried by the body and discharging into the cylinder, a needle in the body controlling the flow of fuel to the nozzle and into the cylinder, said body having a conduit therein communicating with the engine cylinder, said body having a chamber therein communicating with the conduit, a piston in the chamber, a plunger actuated by the piston, said body having a fuel receiving chamber into which the plunger extends, a pipe affording communication between the fuel chamber and nozzle, said pipe extending through the conduit and annularly spaced from the wall thereof, and means for operating the needle valve to control the flow of fuel through the nozzle into the cylinder.

2. A fuel injector for internal combustion engines comprising a body for attachment to an engine cylinder, a nozzle in the body discharging into the cylinder, a needle valve movable axially in the body and controlling the flow of fuel to and from the nozzle, said body having a fuel receiving chamber and a pressure chamber therein, a piston in the pressure chamber operable by the compression from the cylinder, a plunger movable in the fuel chamber actuated by the piston, said body having a conduit affording communication between the pressure chamber and engine cylinder, a pipe in the conduit annularly spaced from the wall thereof, said pipe affording communication between the fuel chamber and nozzle, means for forcing fuel into the fuel chamber, and means for controlling the movement of the needle valve.

3. A fuel injector for internal combustion engines comprising a body for attachment to the engine cylinder, said body having a nozzle carried thereby and discharging into the cylinder, means for controlling the movement of the valve, said body having a pressure chamber therein, a conduit connecting the cylinder and pressure chamber, a fuel chamber below the pressure chamber, a piston in the pressure chamber actuated by the compression from the cylinder through the conduit, a plunger operable by the piston and movable in the fuel chamber, said body having an accumulator chamber therein communicating with the fuel chamber, and a fuel conducting pipe disposed coaxially within the conduit for conducting fuel from the fuel chamber to the nozzle.

4. A fuel injector for internal combustion engines comprising a body for attachment to the engine cylinder, the body having a pressure chamber and a fuel chamber therein, said body having a conduit connecting the pressure chamber and the cylinder, a nozzle in the body discharging into the cylinder, a piston in the pressure chamber, a plunger actuated by the piston and operating in the fuel chamber, the piston being actuated by the compression in the cylinder through the conduit, means for conducting fuel from the fuel chamber to the nozzle, said body having an accumulator chamber therein communicating with the fuel chamber, a pump for feeding fuel into the accumulator chamber, and a non-return check valve associated with the accumulator chamber, as and for the purpose set forth.

In testimony whereof I affix my signature.

PIETRO TARAGNO.